United States Patent
Chabanne et al.

(10) Patent No.: US 6,736,458 B2
(45) Date of Patent: May 18, 2004

(54) DEVICE FOR THE VERTICAL AND AUTOMATIC WEDGING OF A VEHICLE SEAT

(75) Inventors: Jean-Pierre Chabanne, Champvallon (FR); Jean Chateau, Pont Salomon (FR)

(73) Assignee: Grupo Antolin-Ingenieria, S.A. (ES)

(*) Notice: Subject to any disclaimer, the term of this patent is extended or adjusted under 35 U.S.C. 154(b) by 0 days.

(21) Appl. No.: 10/364,016

(22) Filed: Feb. 10, 2003

(65) Prior Publication Data

US 2003/0151289 A1 Aug. 14, 2003

(30) Foreign Application Priority Data

Feb. 8, 2002 (FR) .......................................... 02 01797

(51) Int. Cl.⁷ .......................... A47C 1/02; B60N 2/42; F16M 13/00
(52) U.S. Cl. .......................... 297/344.1; 297/216.15; 248/429
(58) Field of Search .................... 297/344.1, 216.15; 248/429; 411/84, 85

(56) References Cited

U.S. PATENT DOCUMENTS

| | | | | |
|---|---|---|---|---|
| 3,259,354 A | * | 7/1966 | Dall ............................ | 248/429 |
| 3,445,143 A | * | 5/1969 | Swenson ..................... | 384/34 |
| 4,575,295 A | * | 3/1986 | Rebentisch .................. | 411/85 |
| 4,588,226 A | * | 5/1986 | Young et al. .......... | 297/344.24 |
| 4,729,601 A | * | 3/1988 | Walle et al. ........... | 297/344.24 |
| 4,830,531 A | * | 5/1989 | Condit et al. ............... | 403/348 |
| 5,106,144 A | * | 4/1992 | Hayakawa et al. ......... | 296/68.1 |
| 5,489,173 A | * | 2/1996 | Hofle .......................... | 411/85 |
| 5,655,816 A | | 8/1997 | Magnuson et al. | |
| 5,823,727 A | | 10/1998 | Lee | |
| 6,299,120 B1 | * | 10/2001 | Girardi et al. .............. | 248/429 |
| 6,367,758 B1 | * | 4/2002 | Garrido et al. ............. | 248/421 |

FOREIGN PATENT DOCUMENTS

| | | |
|---|---|---|
| EP | 0565973 | 4/1994 |
| EP | 0947380 | 10/1999 |
| EP | 0949111 | 10/1999 |
| EP | 1176047 | 1/2002 |

OTHER PUBLICATIONS

Internation Application Published Under the Patent Cooperation Treaty (PCT) WO 95/02520, Clausen, Edvin.*

* cited by examiner

*Primary Examiner*—Peter M. Cuomo
*Assistant Examiner*—Sarah C. Burnham
(74) *Attorney, Agent, or Firm*—Cantor Colburn LLP

(57) ABSTRACT

A device for wedging an adjustable removable seat vertically in a C-shaped slideway, the seat being secured to an underframe having a subassembly able to run in the C-shaped slideway, the subassembly including a catch collaborating with a return of the slideway, and a retaining hook able to collaborate with the return of the slideway when the seat is subjected to an impact energy, the device including a vertical journal mounted to rotate in a bearing of the underframe, a member for wedging in terms of vertical translation, connected in terms of rotation to a lower end of the journal and having, when viewed from above, a generally rectangular overall shape a shortest dimension of the rectangular shape being less than a width of a groove of the C-shaped slideway and a longest dimension of the rectangular shape being greater than the width of the groove, so as to be able, in a wedged position, to sit under the internal returns of the slideway, a spring constantly returning the wedging member to the wedged position, a pivoting means for pivoting the journal against action of a return spring of the journal into a position in which the wedging member can be engaged in the groove of the slideway, and a helical ramp, rotatable with the journal to collaborate with a fixed complementary bearing surface to move the wedging member vertically into contact with the return of the slideway.

5 Claims, 3 Drawing Sheets

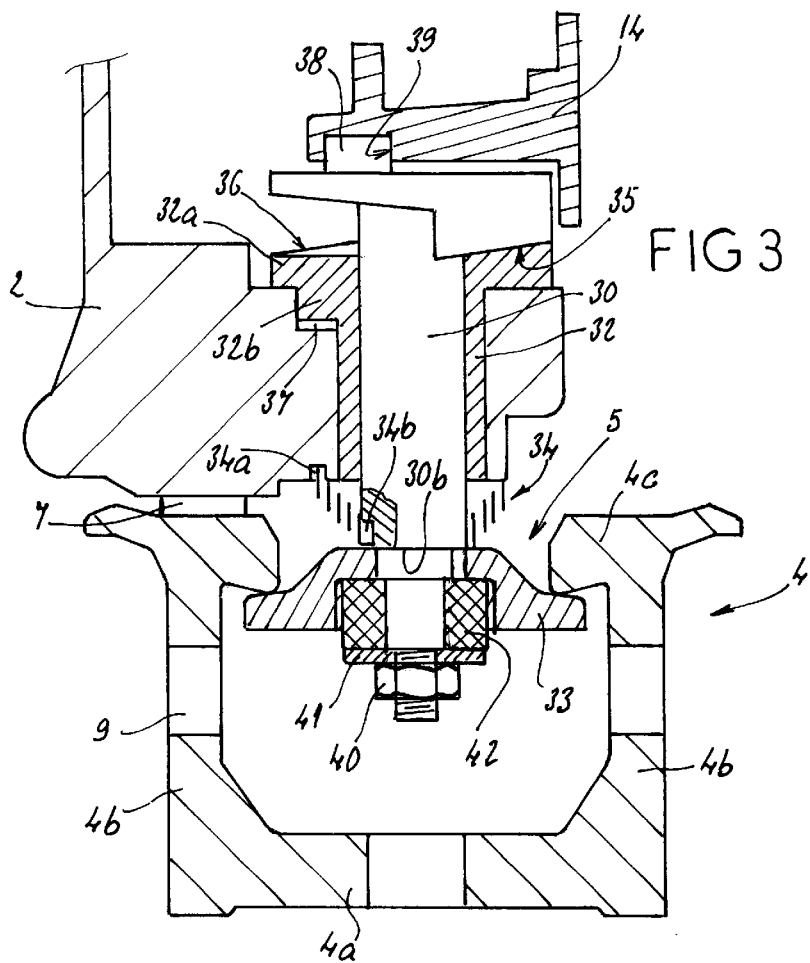
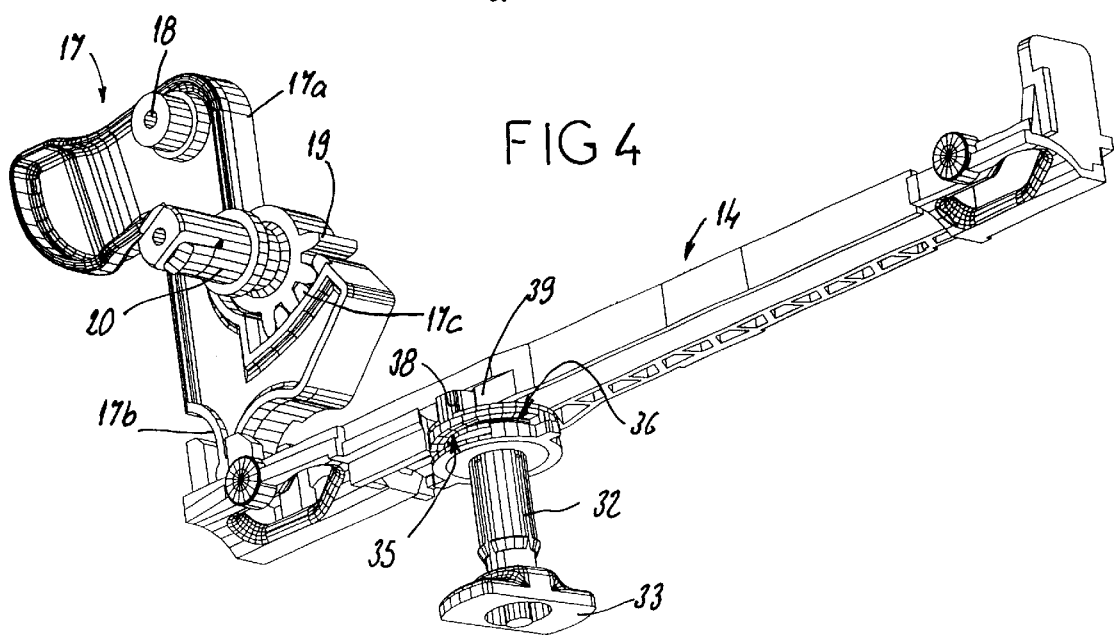

DEVICE FOR THE VERTICAL AND AUTOMATIC WEDGING OF A VEHICLE SEAT

BACKGROUND OF THE INVENTION

The invention relates to a device for the vertical and automatic wedging in C-shaped slideways of a vehicle removable seat. It relates more especially to removable seats comprising, on the one hand, means of positioning in longitudinal slideways fixed to the floor of the vehicle and, on the other hand, retaining hooks able to collaborate with the internal returns of the slideway when the seat is subjected to impact energy and, in addition, means allowing their longitudinal position to be adjusted, with locking in the chosen position.

DESCRIPTION OF THE PRIOR ART

In these seats, the seat-part structure is secured to an underframe formed of two subassemblies, namely a right-hand one and a left-hand one, each comprising a rigid sideplate the lower part of which is set out in the form of a runner to run in a C-shaped slideway, and, borne by this runner:

- catches, collaborating with returns, teeth or notches of the slideway,
- retaining hooks,
- and an actuator connected to control means borne by the seat and to return means, for controlling the movements of the catches and of the hooks.

In spite of the care taken in manufacturing the components of the underframe, in assembling these components and in fitting the slideways, the build-up of manufacturing tolerances may, in certain seat/slideway combinations, form vertical clearances which, even when the seat is wedged and locked in its slideways, encourage vertical movements of small amplitude but which generate noise and discomfort to the occupant.

SUMMARY OF THE INVENTION

The invention provides a device for the automatic vertical wedging of the underframe of a seat in its slideways.

This wedging device comprises:

- a vertical journal mounted to rotate in a bearing of the underframe,
- a member for wedging in terms of vertical translation, connected in terms of rotation to the lower end of the journal and having, when viewed from above, a rectangular overall shape the shortest dimension of which is less than the width of the groove of the C-shaped slideway and the longest dimension of which is greater than this width, so as to be able, in the wedged position, to sit under the internal returns of the slideway,
- a spring constantly returning the wedging member to its wedging position,
- a means for causing the journal to pivot against the action of its return spring into a position in which the wedging member can be engaged in the groove of the corresponding slideway,
- and at least one helical ramp which, rotating as one with the journal, collaborates with a fixed complementary bearing surface to move the wedging member vertically and bring it into contact with the returns of the slideway.

Thus, each, right or left, subassembly of the seat is equipped with a wedging member which is normally in a wedging position but which, when the runners with which this seat is equipped are introduced into the slideways, is brought into a position of introduction into these slideways. As soon as the seat is positioned therein and the operator stops actuating the journal control means, the return spring associated with each of them returns them to their rest position, in which position the wedging member is arranged transversely to the groove of each slideway. During this rotation, the helical ramp of each journal comes to bear against a complementary bearing surface and causes the journal to move vertically, this having the effect of bringing the wedging member into contact with the underside of the returns of the slideway in which it is arranged, thus ensuring positive connection between the seat and its slideways.

The result of this is that, whatever the functional clearances resulting from the spread of manufacturing tolerances, the underframe is connected to the slideways to eliminate the generation of any noise and any vertical movements, and also horizontal ones, because of the clearance between the catches and the housings accommodating them.

Advantageously, the means controlling the rotation of the journal comprise a vertical finger projecting upward from the head of this journal and an inclined ramp, single or double, formed in a slide controlling the retraction movements of the catches and of the hooks of each of the runners.

Thus, at the same time as the operator actuates the means arranged on the seat to bring the catches and the hooks into the position of retraction, for example before engaging the runners of the underframes in the C-shaped grooves of the slideways, he commands the pivoting of the journal against the action of its return means and allows the wedging member to move from its wedging position to its retraction position allowing it to be engaged in the slideway.

In one embodiment of the invention, the journal has a head under which the helical ramp is formed while the complementary bearing surface collaborating with this ramp is formed on the end face of a flange formed at the upper end of a vertical bearing for the journal, this bearing being attached in the underframe and prevented from rotating with respect to it.

In another embodiment, the helical ramp is formed on the upper face of each of the ends of the wedging member and collaborates with the straight internal face of the C-shaped returns of the slideway.

BRIEF DESCRIPTION OF THE DRAWINGS

Other features and advantages will become apparent from the description which follows with reference to the appended schematic drawing depicting two embodiments of the wedging device.

FIG. 3 is a view in cross section of a first embodiment of the wedging device, when it is in the wedging position, FIG. 4 is a perspective part view of the essential elements of the wedging device of FIG. 3.

DETAILED DESCRIPTION OF INVENTION

Figure 1:
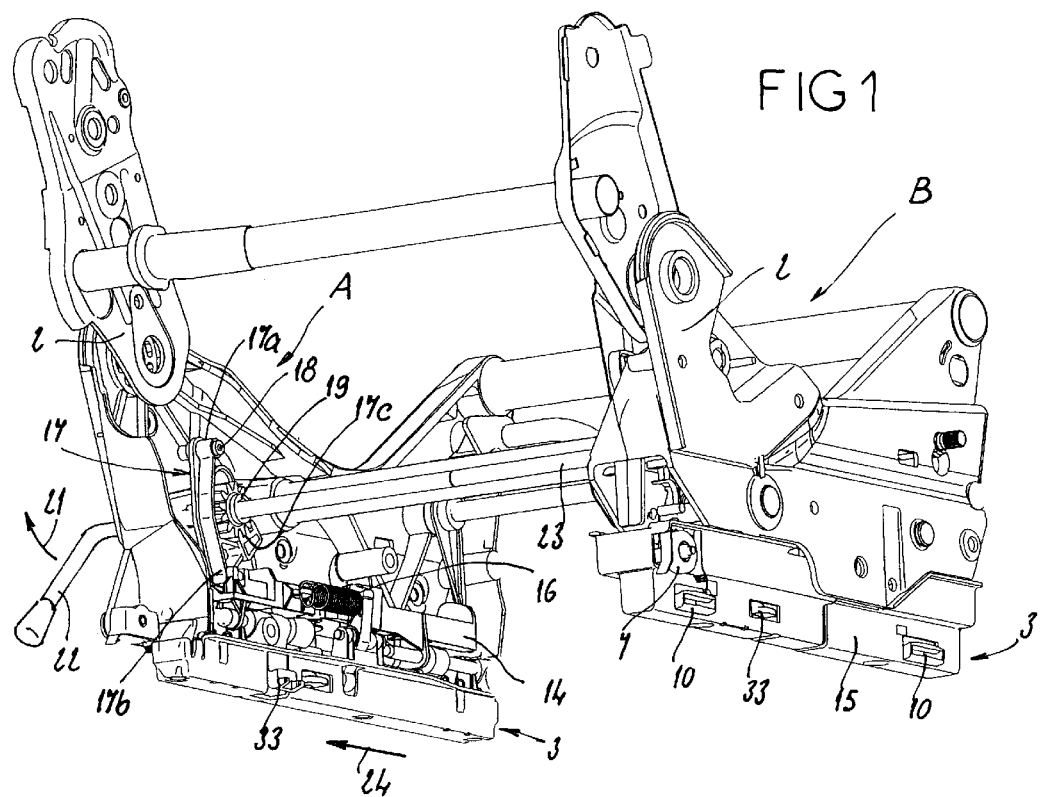
FIG. 1 is a perspective view of the lower part of a seat framework.
Figure 5:
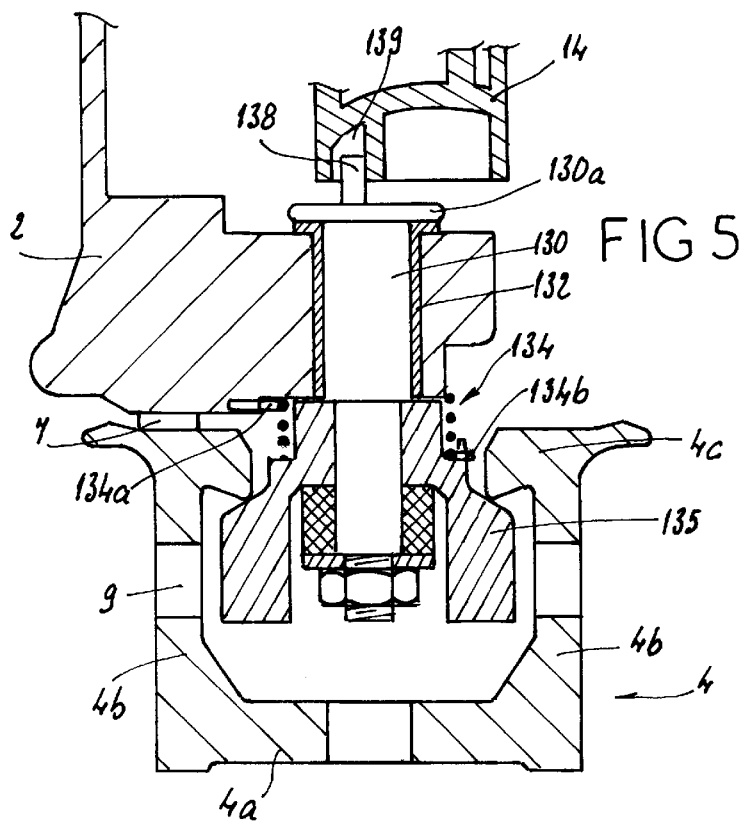
FIG. 5 is a view in cross section of another embodiment of the wedging device, when it is in the wedging position.

As shown in FIG. 1, the device according to the invention applies to a seat the seat-part structure of which is made up of two subassemblies, namely a left-hand one A and a right-hand one B, forming an underframe. Each of these subassemblies comprises a rigid sideplate 2, made of cast metal alloy, and the lower part of which is in the shape of a runner 3 able to run in a slideway 4. As shown in FIGS. 3 and 5, the slideway 4 is in the shape of a C, that is to say made up of a web 4a bordered by two flanges 4b equipped, at their upper free end, with an internal return 4c delimiting, with the return opposite, a groove 5.

Figure 2:
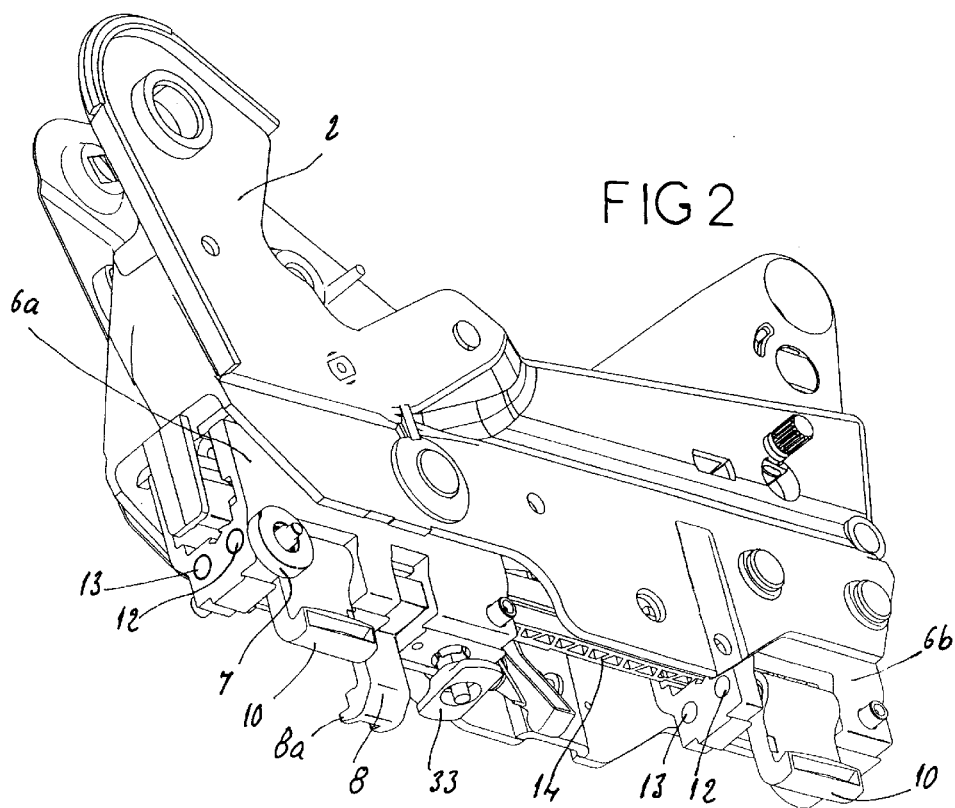
FIG. 2 is a perspective part view of the right-hand underframe of a seat, when the runner-protection covers have been removed.

Each subassembly of the underframe comprises an internal structure bearing directly, or via carriages 6a, 6b as shown in FIG. 2:

rollers 7, able to roll along the returns 4c of the slideway, catches 8, the teeth 8a of which are able to collaborate with apertures 9 made in the flanges 4b of the slideway, and hooks 10 able to sit under the internal returns 4c of the slideway to retain the underframe and seat in the event of an impact which tends to cause the seat and its occupant to rise.

The catches 8 and hooks 10 are mounted with articulation about horizontal and longitudinal axes 12 and 13, are each associated with return means bringing them into a position of use, and are each equipped with a vertical finger, not depicted, collaborating with inclined ramps formed in an actuator or slide 14. The latter is mounted to slide longitudinally in the underframe between a rest position in which it brings the hooks and catches into the work position, and a control position, the opposite to the first, and in which it causes the hooks 10 and the catches 8 to retract into a cover 16 inserted in the opening 5 of the slideway. Each slide 14 is held in the rest position by a tension spring 16 visible in FIG. 1 and is brought into the control position by a mechanism comprising, as shown in FIGS. 1 and 4, on the one hand, a lever 17 one of the ends 17a of which is articulated at 18 to the sideplate 2 of the underframe and the other end 17b of which bears against the corresponding end of the slide 14 and, on the other hand, a gearwheel or toothed sector 19 meshing with a toothed sector 17c of the lever 17. The toothed sector or gearwheel 19 is secured to a shaft 20 which is free to turn in a bearing of the corresponding sideplate 2 and which protrudes out from this sideplate to be connected in terms of rotation to a control lever 22 visible in FIG. 1. In the embodiment depicted in FIG. 1, the gearwheel 19 is connected via a transverse shaft 23 to the gearwheel 19 arranged in the other subassembly.

It will be readily understood that actuation of the lever 22 in the direction of the arrow 21 causes the lever 17 to pivot in the same direction and therefore causes the slide 14 to move, with a step-down ratio, in the direction of the arrow 24.

In a first phase of the movement, the catches 8 are retracted under the underframe to release its locking in the slideways while at the same time allowing the longitudinal position of the seat to be adjusted along its slideways.

In a second phase, and if the travel of the slide 14 is continued, it is the hooks 10 which retract and sit into the bulk of the cover 14 to allow the seat to be extracted from its slideways.

When the lever 22 is released, the tension springs 16 arranged in each of the subassemblies, left A and right B, return the lever 22 and the slides 14 to their starting position. These various means are described in greater detail in European patent application No. 01420158.6, which is herein incorporated by reference in its entirety.

The invention therefore relates to a means of wedging, in their slideway, the two subassemblies A and B of a seat underframe equipped with catches 8 and retaining hooks 10.

In the embodiment depicted in FIGS. 3 and 4, the wedging device comprises:

a journal 30 of vertical axis, mounted to rotate freely in a plastic bearing 32 arranged in a vertical bore of the lower part of the sideplate 2, a member 33 for wedging in terms of vertical translation, wedged in terms of rotation on the lower end of the journal 30, a return spring 34, and a helical ramp 35.

In this embodiment, the ramp 35 is produced under the head 30a of the journal 30 and collaborates with a complementary ramp 36 projecting from the end face of a flange 32a of the bearing 32. This bearing is wedged in terms of rotation by a protrusion 32b housed in a notch 37 formed at the edge of the bore for the bearing 32.

The head 30a of the journal 30 comprises, projecting upward, a vertical finger 38 which collaborates with a ramp 39 formed in the slide 14.

The spring 34 is a torsion spring, particularly a spiral spring one of the ends 34a of which is connected to the sideplate 2 and the other end 34b of which is connected to the journal 30.

As shown in greater detail in FIG. 4, the wedging member 33 has a rectangular overall shape and has a width smaller than the width of the groove 5, formed between the two internal returns 4c of the slideway 4, and a length greater than this width. FIG. 3 shows that it is pressed hard against a shoulder 30b of the journal 30 by a nut 40/washer 41 system screwed onto the lower free end of the journal and compressing against it a sleeve 42 made of viscoelastic material. This member 33 is connected in terms of rotation to the journal 30 by a key or more simply by the collaboration of flats, made in its bore, with complementary flats formed on the journal 30.

With this arrangement, during the operation of engaging a seat underframe in its slideways, actuation of the lever 22 causing, by means of the slides 14 arranged in each underframe, retraction of the catches 8 and retaining hooks 10 into the covers 15, also, by way of the ramp 39 of each slide collaborating with the finger 38 of each of the journals, causes the journal to rotate through 90°. The result of this is that the wedging member 33 pivots and that its largest dimension becomes longitudinal. This being the case, the wedging members become inserted in the bulk of the covers 15 and of the runners which engage in the corresponding slideway 4.

When the operator has longitudinally positioned the underframe in the slideways and releases the lever 22, the return springs 16 move the slides 14 in the opposite direction to the arrows 24, and this allows the catches 8 to return to their work position, engaging their teeth 8a in the notches 9 of the flanges of the slideway, and allows the hooks 10 to come underneath, but without contacting, the internal returns 4c of the slideways. At the same time, each of the wedging members 33 is returned by its spring 34 to its work position in which it is arranged transversely as depicted in FIG. 3. During this rotation, the helical ramp 35 of the head of the journal comes into contact with the ramp 36 opposite it and causes the entire journal to move vertically upwards until the wedging member 33 comes into contact with the underside of the internal returns 4c of the slideway, as shown in FIG. 3.

As a result, even with an unfavorable combination of manufacturing tolerances on the seat and on the slideways respectively, all the vertical clearances are taken out and the sources of noise and discomfort are therefore eliminated.

It should be noted that, in order to avoid the movements of the occupant in the seat generating a force tending to extract the underframe from the slideway which could cause breakage of the longitudinal ends of the wedging member 33, the viscoelastic sleeve 42 can compress, giving the journal 30 and the corresponding underframe a slight vertical disengagement travel that reduces the force on the member 33.

Figure 6:
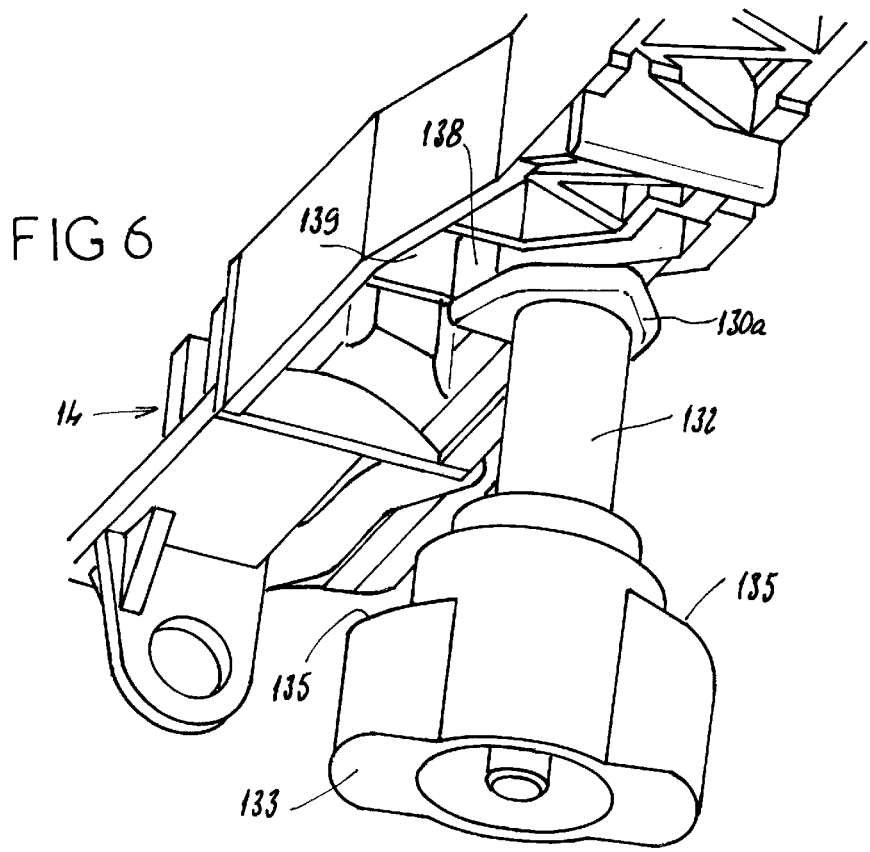
FIG. 6 is a perspective part view of the wedging device of FIG. 5 and of its control slide.

In the embodiment depicted in FIG. 6, those elements of the wedging device which perform the same functions as in the previous embodiment bear the same references but increased by 100. This device bears the journal 130 with a head 130*a* equipped with a journal 138 collaborating with a ramp 139 of the slide 14. The helical ramp 135 is not formed on the head, but on each of the ends of the wedging member wedged at the lower end of the journal. The return spring 134 returning the member 133 is a helical torsion spring one of the ends 134*b* of which is connected to the member 133, while the other end 134*a* is connected to the sideplate 2. The journal is mounted free to rotate in a bearing 132 made of plastic and push-fitted into a vertical bore in the sideplates 2.

Except for these constructional differences, the wedging device works in the same way, namely that, as the control handle arranged on the seat is released, the return spring 134 causes the wedging member 133 to pivot through 90° so that its ramps 135 come into contact with the internal face of the returns 4*c* of the slideway 4 and immobilize the connection between the underframe and its slideways in terms of vertical translation.

FIG. 6 shows that, as in the previous embodiment, the width of the member 133 allows it to enter the slideway in the phase of fitting or extraction of the seat.

In the embodiments which have been described hereinabove, the means of turning the journal against the action of its return spring consist of a finger collaborating with one or two ramps, but it is obvious that these means may adopt any other form, such as the form of racks or levers, provided that the journal can rotate through 90° in order to bring the member for wedging in terms of vertical translation from its normal wedged position to its retracted position allowing it to enter the groove 5 of the slideway 4.

What is claimed is:

1. A device for wedging an adjustable removable seat vertically in a C-shaped slideway, the seat being secured to an underframe having a subassembly able to run in the C-shaped slideway, the subassembly including a catch collaborating with a return of the slideway, and a retaining hook able to collaborate with the return of the slideway when the seat is subjected to an impact energy, the device comprising:

a vertical journal mounted to rotate in a bearing of the underframe;

a member for wedging in terms of vertical translation, connected in terms of rotation to a lower end of the journal and having, when viewed from above, a generally rectangular overall shape a shortest dimension of the rectangular shape being less than a width of a groove of the C-shaped slideway and a longest dimension of the rectangular shape being greater than the width of the groove, so as to be able, in a wedged position, to sit under the internal returns of the slideway;

a spring constantly returning the wedging member to the wedged position;

a pivoting means for pivoting the journal against action of a return spring of the journal into a position in which the wedging member can be engaged in the groove of the slideway; and a helical ramp, rotatable with the journal to collaborate with a fixed complementary bearing surface to move the wedging member vertically into contact with the return of the slideway.

2. The device for vertically wedging a removable seat as claimed in claim 1, further comprising controlling means for controlling the rotation of the journal including a vertical finger projecting upward from a head of the journal and an inclined ramp formed in a slide controlling the movements of the catch and of a hook of the subassembly for retraction.

3. The device for vertically wedging a removable seat as claimed in claim 1, wherein the journal includes a head under which the helical ramp is formed while a complementary bearing surface collaborating with the ramp is formed on an end face of a flange formed at an upper end of a vertical bearing for the journal, this bearing being attached in the underframe and prevented from rotating with respect to the underframe.

4. The device for vertically wedging a removable seat as claimed in claim 1, wherein the helical ramp is formed on an upper face of the wedging member and collaborates with a straight internal face of the return of the slideway.

5. The device for vertically wedging a removable seat as claimed in claim 1, wherein a sleeve made of viscoelastic material is inserted in a link in terms of vertical translation between the journal and the wedging member.

\* \* \* \* \*